United States

Kitano et al.

[15] 3,650,598
[45] Mar. 21, 1972

[54] LIGHT-CONDUCTING GLASS STRUCTURE HAVING A PERIPHERAL LIGHT-ABSORBENT LAYER

[72] Inventors: Ichiro Kitano, Kobe-shi; Ken Koizumi, Itami-shi; Yoshiro Ikeda, Nishinomiya-shi; Hiroyoshi Matsumura, Osaka-shi, all of Japan

[73] Assignee: Nippon Selfoc Kabushiki Kaisha (a/k/a Nippon Selfoc Co., Ltd.), Tokyo-to, Japan

[22] Filed: Sept. 29, 1969

[21] Appl. No.: 861,897

[30] Foreign Application Priority Data

Oct. 1, 1968   Japan..................................43/71721

[52] U.S. Cl..........................350/96 R, 350/175 GN, 65/30, 65/32, 65/2
[51] Int. Cl...........................................G02b 5/14
[58] Field of Search...............350/96, 96 B, 96 WG, 175 GN, 350/276; 65/30, 32, 2

[56] References Cited

UNITED STATES PATENTS

| | | |
|---|---|---|
| 2,748,020 | 5/1956 | Parsons et al......................350/276 X |
| 3,083,123 | 3/1963 | Navias..........................350/175 GN X |
| 3,320,114 | 5/1967 | Schulz................................350/96 X |
| 3,434,774 | 3/1969 | Miller..........................350/96 WG X |
| 3,486,808 | 12/1969 | Hamblen..........................351/169 X |
| 3,563,057 | 2/1971 | Rosenbauer......................351/169 X |

OTHER PUBLICATIONS

Miller Article in Bell System Technical Journal Vol. 44 No. 9 Nov. 1965 pgs. 2017– 2030 cited.

Kawakami et al. Article in Proceedings of the IEEE Dec. 1965, pp. 2148 and 2149 cited.

*Primary Examiner*—David H. Rubin
*Attorney*—Robert E. Burns and Emmanuel J. Lobato

[57] ABSTRACT

A transparent glass body having a light-focusing effect and a refractive index decreasing progressively from its centerline outward and containing readily reducible metal oxides in at least the outer peripheral part thereof is caused to contact a gas having a reducing effect thereby to reduce the metal oxides and form a light-absorbent layer of metal colloid in the outer peripheral part.

1 Claims, 2 Drawing Figures

LIGHT-CONDUCTING GLASS STRUCTURE HAVING A PERIPHERAL LIGHT-ABSORBENT LAYER

BACKGROUND OF THE INVENTION

This invention relates generally to glass structures and more particularly it relates to new light-conducting glass structures each consisting, essentially, of a glass body having a light-focusing effect and a light-absorbent layer formed in the outer peripheral part of the glass body.

In accordance with the present invention, a transparent body having such a focusing effect is one which has a refractive index distribution such that, in any cross section thereof transverse to the direction in which light is intended to advance therethrough, the refractive index decreases progressively outward from the center. When a light beam is projected through the sections of this transparent body, the beam is continually refracted or curved toward the direction in which the refractive index increases. An incident light beam focused to an appropriate size is repeatedly refracted in this manner and is conducted through the interior of the transparent body.

A light beam conducted in this manner by being repeatedly refracted without any expansion thereof is accompanied by very little phase velocity lag at the light existing part of the transparent body and is advantageous for multiplex light pulse communication. Preferably, the refractive index distribution in any cross section transverse to the direction of advance of the light beam substantially satisfies the following equation.

$$n_r = n_0(1 - ar^2)$$

where:
$n_0$ is the refractive index at the center;
$r$ is distance from the center;
$n_r$ is the refractive index at a distance $r$ from the center; and
$a$ is a positive constant.

It is known that when this equation is satisfied, there is no phase velocity lag of an appropriate light beam conducted through the transparent body, which, at the same time, has the optical effect of a convex lens.

An example of such a transparent body having a light-focusing effect is a so-called gas lens described in the Bell System Technical Journal, July 1964, pp. 1469-1479. Another example is a light-conducting glass fiber having the aforementioned refractive index gradient and having a light focusing effect, as proposed in the Proceedings of the I.E.E.E., Vol. 53, Dec. 1965, pp. 2148—2149, in which a light-conducting glass fiber provided in its outer peripheral part with a light-absorbing layer is described.

A light-absorbing layer of this character is used for the purpose of absorbing and removing light which advances along the light conduction path as it is reflected by the outer periphery of the conduction path and light infiltrating into the conduction path from the outer periphery thereof. However, various difficulties have been encountered in providing a light-absorbing layer on such a light-conducting glass body having a self-focusing effect.

For example, one difficulty occurring in the process of coating the outer periphery of the light-conducting glass body with a molten light-absorbent glass at a high temperature is that, when the temperature of the light-conducting glass body exceeds the softening point thereof, migration of the constituents composing the light-conducting body occurs therewithin, whereby the aforementioned desirable refractive index gradient is disrupted, and deleterious changes in the characteristics of the glass body such as loss of focusing effect and deterioration of the resolution thereof as a lens occur.

Even when this migration of the glass constituents is prevented by using a glass of low melting point or an organic substance for the light-absorbent layer thereby to cause the temperature of the light-conducting body during the coating procedure to be below its softening point, strain is caused at the interface between the light-conducting glass body and the light-absorbent layer by the difference in the thermal expansion coefficients thereof, and light which reaches this interface undergoes double refraction. Furthermore, the light reaching the interface is subjected to reflection by the difference in the refractive indexes at the interface. The resulting rays of light thus advance through the interior of the light-conducting glass body, becoming light of different phase velocities, that is, noise, in the case of multiplex light pulse communication and lowering the resolution of the image in the case of image conduction.

SUMMARY OF THE INVENTION

It is an object of the present invention to provide a light-conducting glass structure consisting, essentially, of a glass body having a light focusing effect provided in its outer peripheral part with a light-absorbent layer and to provide a method for producing the same, which structure and method are not accompanied by the above described difficulties.

According to the present invention, briefly summarized, there is provided a light-conducting glass structure comprising an optically transparent glass body having a refractive index distribution as described hereinabove and having a light-focusing effect and a light-absorbent layer of metal colloid formed in the outer peripheral part of the glass body by reducing at least one metal oxide therein.

The nature, principle, details, and utility of the invention will be more clearly apparent from the following detailed description when read in conjunction with accompanying drawing, in which like parts are designated by like reference numerals.

DETAILED DESCRIPTION

Figure 1:
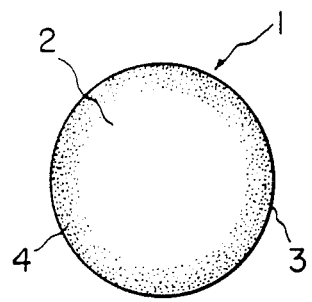
FIG. 1 is a cross section of an example of a light-conducting glass structure according to the invention.

A glass body having a refractive index distribution such that, in a cross section thereof transverse to the direction in which light is to advance within the body, the index continuously decreases outward from the center of the cross section can be produced by a process, for example, as described in detail in U.S. patent application Ser. No. 806,368 filed on Mar. 12, 1969, titled LIGHT-CONDUCTING GLASS STRUCTURES AND PRODUCTION THEREOF now abandoned in favor of a continuation-in-part application Ser. No. 147,256 filed on May 26, 1971.

Such a process comprises the steps of causing a glass containing at least one first cation constituting a modifying oxide of the glass to contact a source of a second cation constituting a modifying oxide as the glass is maintained at a temperature at which the first and second cations can migrate within the glass in a manner to cause a greater substitution of the first cation in regions of the glass nearer to the surface thereof by the second cation, this substitution thereby establishing a refractive index distribution within the glass wherein the refractive index varies progressively in directions transverse to the intended path of advance of light, whereby the direction of light advance is refracted toward the direction in which the refractive index increases.

In general, the refractive index of a substance has a relationship to the molecular refraction and molecular volume characteristic of that substance and increases with increase in the molecular refraction and with decrease in the molecular volume. The molecular refraction is proportional to the polarizability of that substance. It is considered that the molecular refraction of a glass can be represented as an approximation by the sum of the individual ion refractions. Accordingly, the qualitative effect of the presence of certain ions on the refractive index of a glass can be determined from a comparison of the values of electronic polarization per unit volume or the values of (electronic polarisability)/(ion radius)³ of the ions concerned.

In general, cations of larger ratios of electronic polarizability to (ion radius)³ within a glass have a tendency to contribute more greatly to increase in refractive index. That is, this tendency in the case of monovalent cations is of the sequence: Tl Li K = Na = Rb. In the case of divalent cations, the relationship thereof in the order of degree of contribution toward increase in the glass refractive index is: Pb Ba Cd Sr Ca Zn Be Mg.

A glass body having a refractive index distribution such that the index decreases with continuity outward from the center in a cross section thereof transverse to the intended direction of advance of light therethrough can be produced, as described in the aforementioned copending application, by causing a glass body containing certain cations constituting modifying oxides of the glass to contact a salt which contains cations having a lower value of (electron, polarisability)/(ion radius)³ than the first mentioned cations and, moreover, is capable of constituting modifying oxides of the glass thereby to cause a portion of the cations constituting modifying oxide of the glass to be substituted by the cations within the salt.

In accordance with the present invention, a light-conducting structure can be produced, in general, by heating a light-conducting glass body having a light-focusing effect and containing thallium oxide in the outer peripheral part thereof in a reducing environment at a temperature below the softening point of the glass body thereby to reduce a part of the thallium oxide and form a light-absorbent layer of colloidal thallium in the outer peripheral part of the glass body.

Examples of the reducing agent are hydrogen and carbon monoxide, hydrogen being preferably because it is more effective. The reducing gas can be employed in admixture with another reducing gas or in admixture with a non-reducing gas.

Reduction of the metal oxide with the reducing agent proceeds from the surface of a glass structure in the treatment, and the metal oxide in the surface area is reduced to form a metal colloid layer which is light-absorbent. The thickness of the layer can be controlled by the employment of a proper combination of reducing conditions such as temperature, time, and type of the reducing agent for a given composition of a glass.

In order to indicate still more fully the nature and utility of the invention, the following example of practice constituting a preferred embodiment of the invention is set forth, it being understood that this example is presented as illustrative only and that it is not intended to limit the scope of the invention.

EXAMPLE

A glass rod having a circular cross section of a diameter of 1 mm. and composed of 20 percent of $Tl_2O$, 10 percent of PbO, 14 percent of $Na_2O$, and 56 percent of $SiO_2$ (all percentages being by weight) was immersed for 48 hours in a potassium nitrate bath at 480° C., then washed with warm water, and dried.

The glass rod thus treated had a refractive index of 1.57 at its center and of 1.54 at its outer peripheral part, and the internal refractive index distribution was such as to be representable as an approximation by the equation $n_r = n_0(1-ar)$, where $a = 12$ cm⁻².

This glass rod having a focusing effect was subjected to a reducing treatment for 30 minutes in an electric furnace maintained at 450° C. and supplied thereinto with hydrogen gas at a flow-rate of 4 liters/min. and was then slowly cooled. The two ends of the resulting glass rod were ground to from planar end surfaces perpendicular to the rod axis. The cross section of the rod to be of the character indicated in FIG. 1.

Figure 2:
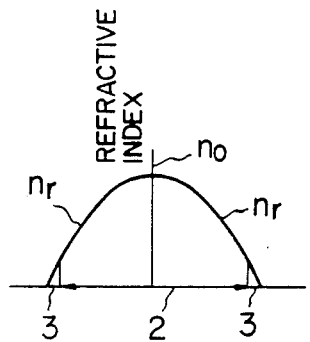
FIG. 2 is a graphical representation indicating the refractive index distribution in the radial direction over the cross section of the glass structure shown in FIG. 1.

That is, within an annular region from the outer surface of the outer peripheral part 3 of the interior 2 of the glass rod 1 to a circle approximately 30 microns inward from the outer surface, a light-absorbent layer of a black colloid 4 of Pb and Tl was found to have been formed. The interior 2, that is, the light-conduction part, of the glass rod was transparent, and the refractive index distribution was found to be unchanged relative to that prior to the reducing treatment. It was difficult to distinguish the interface between the interior 2 and the outer peripheral part 3, and the variation of the refractive index at the interface was continuous as indicated in FIG. 2.

From other similar procedures, it was found that the thickness and the color tone of the light-absorbent layer differ depending on the treatment time and temperature of the reducing treatment and differ also with the metal oxide reduced within the glass. It was found further that oxides of silver, gold, copper, and nickel, as constituents, can also produce colloids within the glass to form light-absorbent layers.

Thus, in the light-conducting glass structure according to the invention, it is possible to form a light-absorbent layer at the outer peripheral part thereof without causing a migration of the glass constituents of the light conducting part thereof. Moreover, the refractive index varies substantially continuously through the light-conducting part and the light-absorbing absorbing layer, whereby reflection does not occur at the interface therebetween. Accordingly, excellent signals can be transmitted particularly in multiplex light pulse communication, and images or pictures of excellent resolutions can be transmitted in conduction of pictures.

Furthermore, because of the existence of the metal colloid of the light-absorbent layer at the outer peripheral part of the light-conducting glass structure according to the invention, the migration of Na and Tl within the glass is suppressed, whereby the weather resistance of the glass structure is excellent.

Particularly in a glass structure to which the refractive index distribution has been imparted by an ion-exchange process, the refractive index distribution at the outer peripheral part thereof tends to deviate from that indicated by the equation set forth hereinbefore, Accordingly, a light-absorbent layer is formed in this outer peripheral part to absorb light passing therethrough, and, therefore, the light-conducting structure according to the invention is capable of exhibiting high resolution when used in the conduction of images or pictures.

We claim:

1. A light-conducting glass structure comprising an optically transparent glass body of uniform cross section to define a rod or fiber configuration, said glass body containing thallium oxide and having a decreasing concentration of said thallium oxide, in cross section, from the central axis to the periphery, to provide a continuously decreasing refractive index gradient substantially corresponding to the formula $n_r = n_0(1-ar^2)$, where $n_0$ is the refractive index at the center axis, $r$ is the distance from the central axis, $n_r$ is the refractive index at distance $r$, and $a$ is a positive constant; the thallium oxide in the peripheral area adjacent the outer surface being reduced by contact with a reducing agent to form an integral light absorbing layer of thallium metal colloid extending inwardly from the peripheral surface.

* * * * *